Dec. 10, 1968     D. G. TWEED     3,415,268
VISCOUS LIQUID LEVEL CONTROL SYSTEM
Filed Oct. 3, 1966
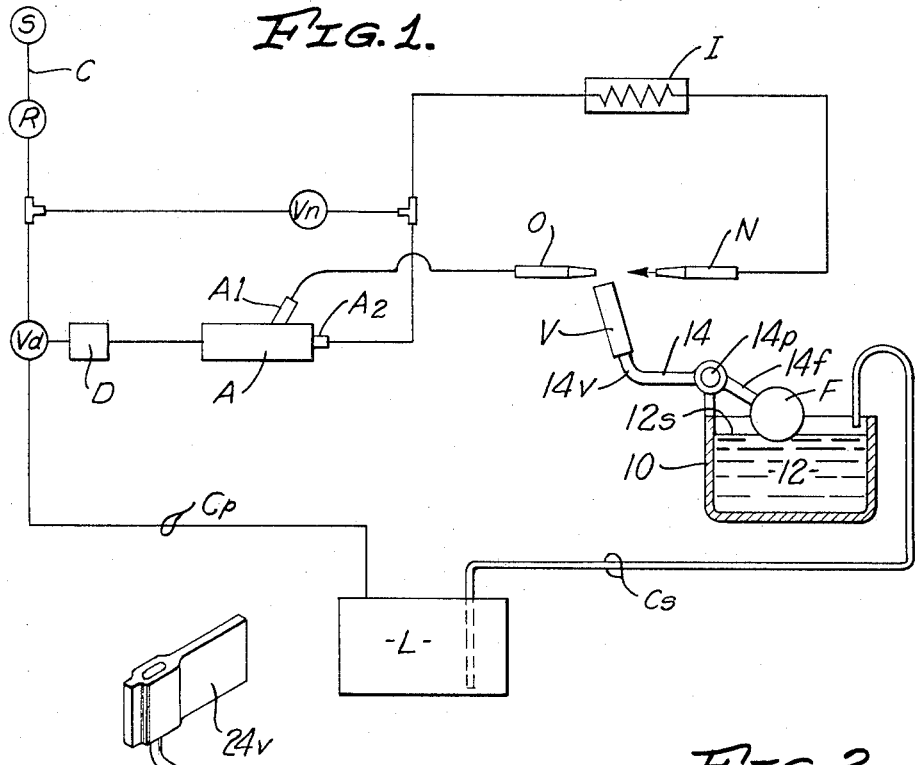
*Fig. 1.*
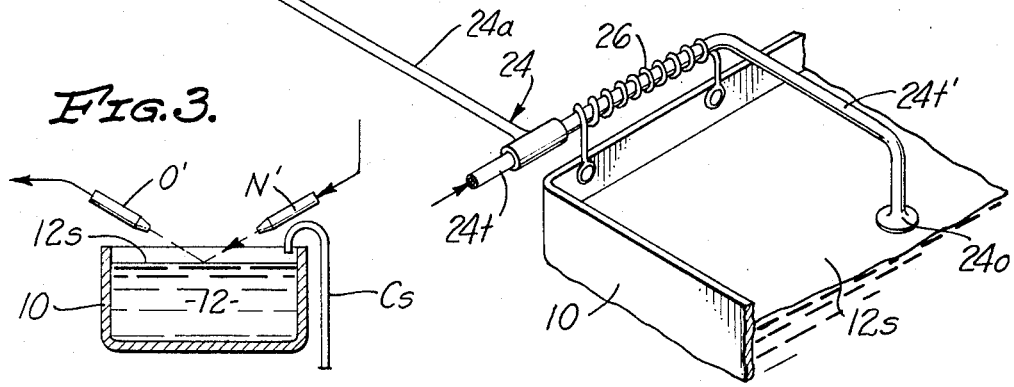
*Fig. 2.*
*Fig. 3.*
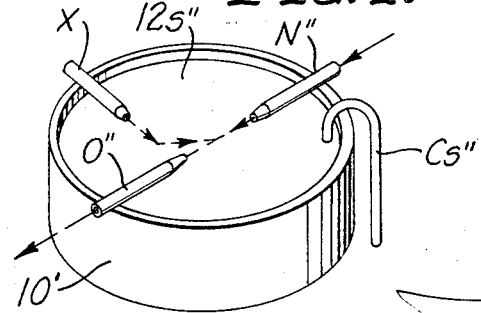
*Fig. 4.*
INVENTOR
DONALD G. TWEED

United States Patent Office 3,415,268
Patented Dec. 10, 1968

3,415,268
VISCOUS LIQUID LEVEL CONTROL SYSTEM
Donald G. Tweed, Riverside, Calif., assignor to Bourns, Inc., a corporation of California
Filed Oct. 3, 1966, Ser. No. 583,559
4 Claims. (Cl. 137—209)

ABSTRACT OF THE DISCLOSURE

The invention herein described and explained pertains to liquid level control systems of the type used to maintain the surface of a body of viscous liquid in an open vessel at a level as constant as is practicable while liquid may be drawn from the vessel at uniform or nonuniform rates. More specifically, the invention is directed to improvements in systems of the abovementioned type whereby the initial cost of the system is made very low and the operating power required is made negligible, all while providing a system capable of maintaining the liquid level with an extremely slight maximum deviation from a desired level.

---

Briefly, the invention comprehends an open vessel from which viscous liquid is withdrawn as needed and in which the liquid level is desirably constant, a closed reservoir containing a supply of the viscous liquid, an open conduit leading from the reservoir to the vessel and through which conduit liquid may be forced when fluid under pressure is admitted to the reservoir, conduit means through which fluid under pressure may be supplied to the reservoir, and control means, including detector means, sensitive to change of surface level of liquid in the vessel and effective in response to extremely small diminution of the level of liquid in the vessel to supply fluid under pressure to the reservoir to cause flow of liquid therefrom to the vessel. The control or detector means utilizes a very inexpensive very small stream of fluid under very low pressure, such as air under low pressure, in a two-state device to control admission of fluid under pressure to the reservoir. In a first state the two-state device initiates transfer of liquid from the reservoir to the vessel, and in the second state the system is idle except for continued expenditure of very small volumes of fluid under very low gage pressure. Since air is a commonly used fluid, and the pressure thereof in the system is very low, the expenditure of energy is negligible.

The means for detecting minute variations of liquid level in the vessel may in some instances be an open stream of the noted fluid, and in other instances may be a device interacting with the liquid in the open vessel and acting on the stream of fluid to change the fluid stream from a first state to the second state, or vice versa. For example, the detector means may be in the form of a conduit and a very small stream of air directed thereby toward the surface of the viscous liquid in the vessel, and a second conduit arranged to intercept the reflected stream of fluid only when the liquid level drops. Thus in a first or "active" state, in which the fluid stream is reflected from the liquid surface and is intercepted by the receiving conduit or receiver, the mass change within the receiver is effective to initiate flow of fluid under pressure into the reservoir to force liquid out and into the vessel. In the second, or "passive" state, the liquid surface is at the proper level to reflect the fluid stream along a path not including the receiver conduit, and no further action occurs until the detecting means changes state.

In general, two-state fluidics devices and their equivalents, such as fluidics flip-flops and turbulence amplifiers, may be employed as, or in, detectors in the system according to the invention.

The preceding brief general explanation of the nature of the invention makes it evident that a principal object of the invention is to provide improvements in viscous liquid level control systems.

Another object of the invention is to provide a highly effective and inexpensive viscous liquid level control system.

Another object of the invention is to provide a viscous liquid level control system which is extremely inexpensive to operate.

Other objects and advantages of the invention are hereinafter stated or made evident in the appended claims and following description of a preferred exemplary embodiment of apparatus according to the invention, and modified forms of subsystems thereof. The exemplary system and apparatus therefor and thereto pertaining are depicted principally in schematic form in the accompanying drawings forming part of this specification and in which drawings:

FIGURE 1 is a schematic diagram depicting apparatus organized and connected according to the system of the invention, with an elementary type of liquid-level detector;

FIGURE 2 is a pictorial representation of an alternative form of the detector means illustrated schematically in FIGURE 1, grossly magnified;

FIGURE 3 is a schematic diagram of a two-state fluidics liquid-level sensor used to sense the level of liquid in an open vessel; and FIGURE 4 is a schematic diagram depicting a fluid switch type of liquid-level detector according to the invention.

Referring to FIGURE 1, an open vessel 10 is arranged to contain viscous liquid 12 which is slowly removed as by a rotatable applicator roll or wheel (not shown) which dips into the liquid and in rotating carries some of the liquid away from the surface 12s of the liquid and applies it to an object with which the roll or wheel is in contact. So that the amount of liquid applied to the object may be very uniform it is extremely desirable that the level of surface 12s should fluctuate or change as little as possible. To the latter end, sensitive means for detecting change in the level 12s are provided and means responsive to the detecting means to add liquid as may be necessary to maintain level 12s within, for example, .002" of a desired elevation in vessel 10. The elementary level-detecting means illustrated in FIGURE 1 comprises a pivoted lever 14 supported on a pivot 14p adjustably mounted relative to vessel 10 and comprising a float arm 14f and a vane arm 14v. Float arm 14f has secured thereto a float F, and vane arm 14v has secured thereto a vane V. The lever is arranged so that float F rises and falls with corresponding changes in the level of surface 12s, concurrently moving vane V.

Fluid under pressure, such as compressed air, is supplied from a source S to a regulator R via a conduit C. Fluid under low gage pressure (e.g., 6 p.s.i.) is supplied from regulator R to a valve Vn, which valve preferably is a needle valve, and from valve Vn to a fluid impedance device I under very low pressure (e.g., six inches water pressure) and to a fluidics amplifier A or like fluid switch device. Fluid impedance device I may in instances be unnecessary, but is effective as indicated to pass fluid under slightly lowered low pressure to a fluid nozzle N via a conduit as indicated. Nozzle N shapes the supplied fluid into a very fine-guage jet stream which is directed to impinge on and be normally intercepted by a fluid orifice O which is connected to one inlet A1 of amplifier A by conduit as indicated. Turbulence amplifier A (or like fluid switch device) is of commercially available type and is so arranged that fluid supplied through valve Vn to an inlet A2 is directed to an orifice connected by conduit to a diaphragm device D. Diaphragm device D, when subjected to pressure created by fluid entering orifice O, is arranged to operate (open) a valve Vd to pass fluid from the supply S to the interior of a closed liquid reservoir L by way of a conduit as indicated. The diaphragm-actuated valve Vd is self-closing when closure is permitted by relief of pressure on diaphragm device D.

Thus when the jet from nozzle N is intercepted by orifice O the intercepted air stream enters inlet A1 of the fluidics amplifier A and therein diverts the jet from inlet A2 away from the orifice leading to diaphragm D, whereby valve Vd remains closed. When the liquid level at 12s commences to lower, float F moves down very slightly, and thereby vane V is moved to disrupt the jet from nozzle N. A movement of the vane of only .002 inch is sufficient to disrupt flow of the very fine-gauge low-pressure jet stream, and since lever 14 can be a multiplying lever, only extremely small fluctuations of the level at surface 12s are required to disrupt the jet stream and/or to re-establish reception by orifice O of the jet stream from nozzle N. When the jet from nozzle N is disrupted as noted, the jet produced by the nozzle in A1 in the amplifier A dies or disappears, permitting the continuously flowing jet from the nozzle of inlet A2 to flow into the orifice leading to diaphragm D. Interception of the latter jet from A2 by the orifice in amplifier A provides the pressure, which, although of low order in terms of pounds per square inch, becomes effective over the large area of the diaphragm to produce force sufficient to open valve Vd.

When valve Vd opens, fluid under pressure from regulator R is admitted into pressure conduit Cp and into closed reservoir L. The pressure thus produced in reservoir L forces liquid through liquid-supply conduit Cs into vessel 10. As a small amount of liquid flows into vessel 10, the level of surface 12s rises imperceptibly a very small distance (e.g., of the order of .002″) and float F rises and moves vane V out of the path of the fluid jet from nozzle N. Thus fluid again enters orifice O and produces a jet at the nozzle of inlet A1, which jet deflects or disrupts the continuous jet from A2 and permits the pressure on diaphragm D to drop and valve Vd to close and terminate transfer of liquid from reservoir L to vessel V.

The volume of air or other fluid under pressure required to operate the system is of the order of less than one cubic foot per hour at the low pressure indicated (6 p.s.i) when a maximum amount of liquid must be transferred from the reservoir to the vessel, and considerably less than that when only occasional liquid transfer is necessary. The fluid jets are small (e.g., of the order of .02″ diameter at the nozzles) and are such as to be barely perceptible to the tactile sense of an observer. As is thus indicated, the jet devices are preferably protected from extraneous air currents, as by shields or housings. Thus it is evident that the invention provides a system that is at once simple, and inexpensive to construct and to operate, yet is extremely sensitive and capable of maintaining the surface level of the liquid in vessel 10 to within one- or two-thousandths of an inch of a desired level.

In some instances it may be undesirable to use a float as a liquid-level sensor; for example, in those cases where liquids of different densities are used and changes or adjustments of positions of apparatus components are undesirable. In such cases, one or another of alternative forms of surface-level detecting means may be substituted for the float device illustrated in FIGURE 1. For example, there may be used a cushion or ground effect device which is of the general form depicted in FIGURE 2 and which device is supplied a stream of fluid such as air or other gas and which is slightly weighted so as to tend to rotate the lever so the mouth or orifice 24o of the tube moves into contact with the liquid in the vessel. Thus, as indicated, the lever 14 is replaced by lever 24 which comprises a tube 24t to which is attached an arm 24a carrying a vane 24v and which tube has a straight portion rotatably supported in a bearing (such as the coiled rod bearing 26 supported at either or both ends by any convenient structure such as a part of vessel V) and an exhaust arm 24t′ which forms the second arm of the lever. The exhaust arm 24t′ is terminated by a depending portion having a preferably flared end shaped as a mouth-like orifice and to be substantially co-planar with the surface of the liquid in vessel 10. Fluid such as air under low pressure is admitted to the intake end of tube 24t, as by means of a flexible supply tubing (not shown) which may be supplied from regulator R or supply S (FIGURE 1). Vane 24v is so disposed as to leave undisturbed the jet from nozzle N when in a first state, and to disrupt the jet in a second state, as previously explained in connection with vane V of FIGURE 1. The flared mouth or orifice 24o of tube 24t of the lever tends to move by gravity into contact with the viscous liquid vessel 10, but is maintained a very small but quite constant distance thereabove by the "ground effect" of the air exiting therefrom. By utilizing a coiled rod, as of spring material, as bearing 26, the bearing may be made to be very inexpensive yet easily adjustable to provide a very precise but low-friction bearing, whereby the accuracy of the sensor and vane are equally as good as that of the float sensor indicated in FIGURE 1. The "ground effect" sensor has the advantage of eliminating contact between the sensor and the liquid, which advantage may be at least in part offset by the requirement for continuous flow of air to provide the ground effect.

In other cases it is desirable to provide liquid-level sensor means which do not involve any moving parts, and in such cases sensor means such as those indicated in FIGURES 3 and 4 may be employed. In FIGURE 3, the vessel 10 containing viscous liquid 12 with a surface 12s to be maintained at a constant level has its liquid supply replenished as required through the conduit Cs as in the case of the system of FIGURE 1. The nozzle N′ directs a jet of fluid under pressure toward the surface as indicated, the jet being deflected by the liquid surface and received in the orifice O′ when surface 12s is at the desired level. The positions of nozzle N′ and orifice O′ are so adjusted; and those components act and produce effects just as do their counterparts N and O in the system of FIGURE 1. Thus when surface 12s commences to drop below the desired level, the jet is deflected slightly away from orifice O′, the pressure in the conduit leading to the nozzle of A1 falls off, and the system operates as previously described to add liquid to vessel 10.

In FIGURE 4 the arrangement of vessel 10′, nozzle N″ and orifice O″ is similar to that of counterpart components 10, N and O of FIGURE 1, but the nozzle and orifice devices are made to pass and receive fluid jet near the surface 12s″ of the viscous liquid in the vessel. A second fluid jet is provided by a nozzle X, so directed at the surface that when the surface 12s″ commences to drop below the desired level the jet therefrom is deflected into the path of the jet provided by nozzle N″, whereby the latter jet is in turn deflected away from orifice O″. Thus as the liquid level commences to drop or lower in vessel 10′, the jet supplied by nozzle A2 (FIGURE 1) becomes effective to provide pressure on diaphragm device D and initiate replenishment of liquid via liquid supply conduit Cs″. The operations of other components of the system are as explained in connection with FIGURE 1.

The preceding description makes it evident that certain procedures may be the inverse of those explained, without change of concept of the invention and with only obvious or elementary changes of apparatus. For example, the action of valve Vd may be reversed, so that the valve is closed incident to application of pressure to the diaphragm D, in which case the liquid-level sensor will be arranged to dispose the vane V in the path of the jet (N to O) when the liquid level is as desired, whereby fall of liquid level initiates movement of vane out of interference position so that the fluid supplied to orifice O deflects the jet from nozzle A2 and pressure on diaphragm D is relieved to permit valve Vd to open and initiate transfer of liquid from the reservoir to the open vessel. Also, by addition of other jet-orifice pairs and utilization of fluid flip-flops the replenishment can be made to occur so as to vary the liquid level between a prescribed upper limit and a prescribed lower limit.

The preceding description of details of a preferred arrangement of apparatus of the system according to the invention, and of the mode of operation thereof, with alternatives for special conditions, makes it evident that the aforenoted objectives of the invention have been attained. In the light of the disclosure changes and modifications within the true spirit and scope of the invention will occur to others, and accordingly it is not desired to restrict the invention to the exact details of the disclosed preferred embodiment except as indicated by the appended claims.

I claim:

1. A viscous liquid level control system adapted to change the state of admission of liquid to maintain the level of liquid in a vessel between first and second level states corresponding to variations of level of the liquid of the order of less than a very small fraction of an inch, irrespective of variations of rate of removal of liquid from the vessel, said system comprising, in combination with the vessel and a closed reservoir of liquid connected by conduit to the vessel:

first means, including a source of gas under low pressure and conduit means for distributing gas from said source;

second means, connected to receive gas under low pressure from said first means and including liquid-level sensing means arranged for coaction with the surface of liquid in said vessel and for providing a jet of gas in a first gas flow state incident to the level of the surface of said liquid being in said first level state and for providing a disturbed jet of gas in a second gas flow state incident to the level of said surface being in said second level state;

third means, including conduit means connecting said closed reservoir and said first means, said third means including valve means interposed in said conduit means for passing gas under pressure to said reservoir when in a first valve state and for preventing passage of gas under pressure to said reservoir from said first means when in a second valve state; and fourth means, connected to said first means and said second means, including actuator means activated by gas supplied thereto, and responsive to said jet of gas in one of said gas flow states to change the state of said valve means, and non-responsive to said jet of gas in the other of said gas flow states, whereby upon commencement of a significant departure of the level of said surface of said liquid in said vessel from either state of said level said departure is sensed by said liquid-level sensing means and the then existing gas flow state of said second means is changed to another gas flow state thereof to change the state of admission of liquid to said vessel to restore said level of said liquid toward the other state thereof, to maintain the level of liquid in said vessel substantially constant.

2. A liquid level control system according to claim 1, in which said liquid-level sensing means includes a means directing a continuing jet stream of gas toward the surface of the liquid in said vessel and means responsive to change of the state of said jet stream to change from one gas flow state to another gas flow state, said jet of gas.

3. A liquid level control system according to claim 1, in which said second means includes a fluidics turbulence amplifier device connected to said actuator means to cause said actuator means to actuate said valve means to change the state of the valve means in response to undisturbed gas flow in said amplifier device, and in which said liquid-level sensing means includes means responsive to change of level of liquid in said vessel to disturb gas flow in said amplifier device.

4. A liquid level control system according to claim 3, in which said liquid-level sensing means includes a movable conduit device having an orifice closely adjacent the surface of liquid in said vessel and means for supplying gas under pressure to said conduit whereby to establish a gas-cushion effect tending to maintain said orifice at a constant distance from such liquid surface, and means connected to said movable conduit device and responsive to movement thereof to change the state of gas flow in said turbulence amplifier device.

References Cited

UNITED STATES PATENTS

| | | | |
|---|---|---|---|
| 2,408,603 | 10/1946 | Braithwaite et al. | 137—83 |
| 2,815,765 | 12/1957 | Adelson | 137—413 X |
| 2,867,233 | 1/1959 | Adelson | 137—413 |
| 2,921,595 | 1/1960 | Erbguth | 137—83 X |
| 2,944,558 | 7/1960 | Dodge | 137—83 X |
| 3,131,601 | 5/1964 | Curran | 137—83 X |
| 3,181,556 | 5/1965 | Baker | 137—389 |
| 3,269,404 | 8/1966 | Lebow | 137—413 X |
| 3,335,746 | 8/1967 | Lebow | 137—389 |

M. CARY NELSON, *Primary Examiner.*

R. C. MILLER, *Assistant Examiner.*

U.S. Cl. X.R.

137—413; 73—37, 290, 316